(12) United States Patent
Mochizuki et al.

(10) Patent No.: US 7,286,274 B2
(45) Date of Patent: Oct. 23, 2007

(54) OPTICAL SCANNER AND IMAGE FORMING APPARATUS USING THE SAME

(75) Inventors: Takeshi Mochizuki, Hitachinaka (JP); Kazutaka Setoma, Hitachinaka (JP); Satoru Wada, Hitachinaka (JP)

(73) Assignee: Ricoh Printing Systems, Ltd., Tokyo (JP)

( * ) Notice: Subject to any disclaimer, the term of this patent is extended or adjusted under 35 U.S.C. 154(b) by 0 days.

(21) Appl. No.: 11/494,442

(22) Filed: Jul. 28, 2006

(65) Prior Publication Data

US 2007/0024941 A1    Feb. 1, 2007

(30) Foreign Application Priority Data

Jul. 29, 2005    (JP)    ............... 2005-220838

(51) Int. Cl.
*G02B 26/08* (2006.01)

(52) U.S. Cl. .............. 359/204; 359/205; 359/207; 359/208; 359/216; 347/243; 347/244

(58) Field of Classification Search ............. None

See application file for complete search history.

(56) References Cited

U.S. PATENT DOCUMENTS 5,777,774 A * 7/1998 Iizuka ................... 359/208

FOREIGN PATENT DOCUMENTS

| JP | 08262355 A | * | 10/1996 |
|---|---|---|---|
| JP | 9-33850 A | | 2/1997 |
| JP | 2000-121985 A | | 4/2000 |
| JP | 2000-275557 | | 10/2000 |
| JP | 2001-4951 A | | 1/2001 |
| JP | 2001-194611 A | | 7/2001 |

* cited by examiner

*Primary Examiner*—James Phan
(74) *Attorney, Agent, or Firm*—Crowell & Moring LLP

(57) ABSTRACT

The invention aims at provision of an optical scanner in which an optics required for equalizing an optical magnification in a scanning range is produced with high accuracy, so that intervals among a plurality of scanning lines on a to-be-scanned surface are even in the scanning range. The scanning optics includes a refraction surface and a reflection surface whose sub-scanning-direction curvature radii vary continuously. The reflection surface is disposed on the to-be-scanned surface side of the refraction surface. The curvature radius of the reflection surface varies symmetrically with respect to the optical axis, and the curvature radius of the refraction surface varies asymmetrically with respect to the optical axis.

8 Claims, 4 Drawing Sheets

OPTICAL SCANNER AND IMAGE FORMING APPARATUS USING THE SAME

FIELD OF THE INVENTION

The present invention relates to an optical scanner which is, for example, used in a laser printer or the like, and an image forming apparatus using the optical scanner, and particularly relates to a scanning optics.

DESCRIPTION OF THE BACKGROUND ART

In an optical scanner used in a laser printer or the like in the background art, a polygon mirror and a photoconductor drum are generally used as an optical deflector and a to-be-scanned surface respectively. A scanning optics is constituted by a lens, a mirror or a combination of them. With increase in speed and density in recording, there is often the case where a plurality of scanning lines are formed concurrently by use of a plurality of beams of light.

To use a plurality of beams, light sources emitting the beams respectively are disposed at an interval of a small distance in a direction (hereinafter referred to as "sub-scanning direction") perpendicular to a direction (hereinafter referred to as "main scanning direction") in which the beams are deflected and scanning is performed therewith. When the small distance is multiplied by an optical magnification between the light sources and the photoconductor drum surface, a predetermined interval is obtained. The beams form scanning lines at the predetermined interval on a photoconductor drum surface.

In a range (hereinafter referred to as "scanning range") to be scanned with the deflected beams, the optical magnification may be uneven. In this case, the interval of the plurality of scanning lines on the photoconductor drum surface will be uneven in the scanning range. Particularly when there is a finite angle between the beams incident on the polygon mirror and the optical axis of the scanning optics, the optical path length will change asymmetrically with respect to the optical axis of the scanning optics with the rotation of the polygon mirror. Thus, the aforementioned optical magnification will be generally asymmetric in the scanning range.

For example, there are methods for making the optical magnification even, in which the scanning optics is made of a lens, using two surfaces whose sub-scanning-direction curvatures are changed continuously in the main scanning direction and independently of the main-scanning-direction curvatures respectively (see undermentioned Patent Documents 1 to 3).

These use a system in which the power distributions of the two surfaces are optimized, that is, the position of a composite principal point is optimized, so that the ratio of the distance between the principal point and an object point to the distance between the principal point and an image point can be fixed independently of the scanning angle. Here, the more closely the two surfaces are disposed, the largely the power of each surface has to be changed to move the position of the composite principal point. In this specification, the power means an operation to bend light, such as refraction, convergence, etc.

For example, Patent Document 1 discloses an example in which one of the surfaces has a negative power (divergence of light) while the other surface has a positive power (convergence of light). The system is apt to be affected by an error due to large absolute values of the two powers.

In order to avoid this, it is desired to dispose the two surfaces as separately as possible in the optical-axis direction. In that case, the surface disposed on the side of the to-be-scanned surface has a comparatively large size in the main scanning direction, that is, longitudinally.

In order to provide the scanning optics with an operation for correcting an optical face tangle error of the polygon mirror, the reflection plane of the polygon mirror and the to-be-scanned surface are generally disposed to be conjugated. In this event, the system is affected by the power of each surface and a location error more easily as the optical magnification between the reflection surface of the polygon mirror and the to-be-scanned surface increases. Also for this reason, it is desired to dispose the composite principal point as closely to the to-be-scanned surface as possible. To this end, the surface disposed on the to-be-scanned surface side has a comparatively large longitudinal size.

A lens having a varying curvature and a comparatively large longitudinal size as described above is generally formed by plastic molding. There is a tendency that it is more difficult to secure the shape accuracy and the homogeneity on a high level as the longitudinal size increases.

There is another method for making the optical magnification even in the scanning range. For example, two surfaces whose sub-scanning-direction curvatures are changed continuously in the main scanning direction and independently of the main-scanning-direction curvatures respectively are used, while those changes are made asymmetrical with respect to the main scanning direction (see undermentioned Patent Document 4). This is an excellent system in which an asymmetrical change of the optical path length can be corrected to make the optical magnification symmetric and even. Due to the plurality of asymmetrical surfaces, it is, however, difficult to align the axes of the surfaces.

There is further another method for making the optical magnification even in the scanning range. For example, a plurality of reflection surfaces having powers in the main scanning direction and the sub-scanning direction and having no rotationally symmetrical axis are used (see undermentioned Patent Document 5). Due to the plurality of rotationally symmetric reflection surfaces having powers both in the main scanning direction and the sub-scanning direction, the accuracy in aligning the axes of the surfaces becomes severe.

There is another disadvantage that the reflection surfaces are greatly affected by a curvature radius error and shape accuracy in comparison with refraction surfaces. Particularly in plastic molding of a reflecting mirror having a longitudinal size, it is difficult to secure high accuracy also due to the influence of expansion and deformation caused by a change in environmental temperature.

Further, when the reflection surfaces are produced by cutting an aluminum material or the like, the integral of a stress vector applied from a to-be-cut piece to a tool serving as a cutter has an angle with respect to the central axis of the tool. That is, force is applied to the tool unequally. That is therefore disadvantageous to the life of the tool and the stability of the accuracy.

The influence of this inequality rarely causes any problem in molding a small number of products. However, when individual reflection surfaces are processed repeatedly, the influence is considerable in terms of an accuracy variation. As for reflection surfaces of an aluminum material about 300 mm in longitudinal size, it is estimated that 50-100 can be processed with one diamond tool.

In a grindstone cutting method in which a cutting tool has a comparatively long life, there is a limit in the size which can be processed by a cutting device. Particularly due to clogging of a grindstone, the method cannot be applied to an aluminum material. Further, the amount of cutting is proportional to the square of the size. Because the cutting quantity is proportional to the square of the size, the influence when the reflection surfaces have power in the main scanning direction, that is, longitudinally becomes very large in terms of the life of the tool and the stability of the accuracy as compared with that when the reflection surfaces have power in the sub-scanning direction.

Patent Document 1: JP-A-9-33850
Patent Document 2: JP-A-2000-121985
Patent Document 3: JP-A-2001-4951
Patent Document 4: JP-A-2001-194611
Patent Document 5: JP-A-2000-275557

SUMMARY OF THE INVENTION

In order to solve the foregoing problems in the background art, an object of the invention is to provide an optical scanner in which an optics required for equalizing an optical magnification in a scanning range is produced with high accuracy so that the intervals of a plurality of scanning lines on a to-be-scanned surface are even in the scanning range, and an image forming apparatus using the optical scanner.

In order to attain the foregoing object, according to a first configuration of the present invention, there is provided an optical scanner including: a light source; an optical deflector for deflecting a plurality of beams emitted from the light source and performing scanning with the beams; and a scanning optics, for example, constituted by a plurality of lenses and reflecting mirrors and provided for scanning a to-be-scanned surface with the plurality of beams deflected by the optical deflector and imaging the beams on the to-be-scanned surface; wherein:

for example, the scanning optics includes refraction surfaces of the lenses for refracting the beams and reflection surfaces of the reflecting mirrors for reflecting the beams, and at least one of the refraction surfaces is a surface having a curvature radius varying continuously in a direction perpendicular to a plane to be scanned with the deflected beams, while at least one of the reflection surfaces is a surface having a curvature radius varying continuously in a direction perpendicular to the plane to be scanned with the deflected beams.

According to a second configuration of the invention, in the optical scanner defined in the first configuration, the reflection surface having a curvature radius varying continuously is disposed on the to-be-scanned surface side of the refraction surface having a curvature radius varying continuously.

According to a third configuration of the invention, in the optical scanner defined in the first or second configuration:

the optical deflector is a polygon mirror, and an angle between each beam incident on the polygon mirror and an optical axis of the scanning optics is a predetermined angle in the plane to be scanned with the deflected beam;

one of the refraction surfaces having a curvature radius varying continuously has a curvature radius varying asymmetrically with respect to the optical axis of the scanning optics in a direction perpendicular to a plane including the deflected beams; and the reflection surface having a curvature radius varying continuously has a curvature radius varying symmetrically with respect to the optical axis in a direction perpendicular to the plane including the deflected beams.

According to a fourth configuration of the invention, in the optical scanner defined in the third configuration, the reflection surface having a curvature radius varying continuously is produced, for example, by grinding or cutting aluminum or the like.

According to a fifth configuration of the invention, in the optical scanner defined in any one of the first to fourth configurations, the reflection surface having a curvature radius varying continuously does not serve to bend light to a main scanning direction.

According to a sixth configuration of the invention, in the optical scanner defined in any one of the first to fifth configurations, the number of beams is 10 or more.

According to a seventh configuration of the invention, there is provided an image forming apparatus including: a photoconductor; a charging unit for charging a surface of the photoconductor; an optical scanner for irradiating the charged surface of the photoconductor with beams in accordance with recording information so as to form an electrostatic latent image; a developing unit for developing the electrostatic latent image with toner so as to form a toner image; and a transfer unit for transferring the toner image onto a recording piece; wherein the optical scanner is an optical scanner according to any one of the configurations 1 through 6.

According to an eighth configuration of the invention, in the image forming apparatus defined in the seventh configuration, a plurality of printing units each having the photoconductor, the charging unit, the optical scanner and the developing unit are provided, and toner images of a plurality of colors are formed by the printing units respectively.

According to the present invention, it is possible to provide an optical scanner in which an optics required for equalizing an optical magnification in a scanning range is produced with high accuracy, so that intervals among a plurality of scanning lines on a to-be-scanned surface are even in the scanning range, and an image forming apparatus using the optical scanner.

DETAILED DESCRIPTION OF THE INVENTION

Figure 1:
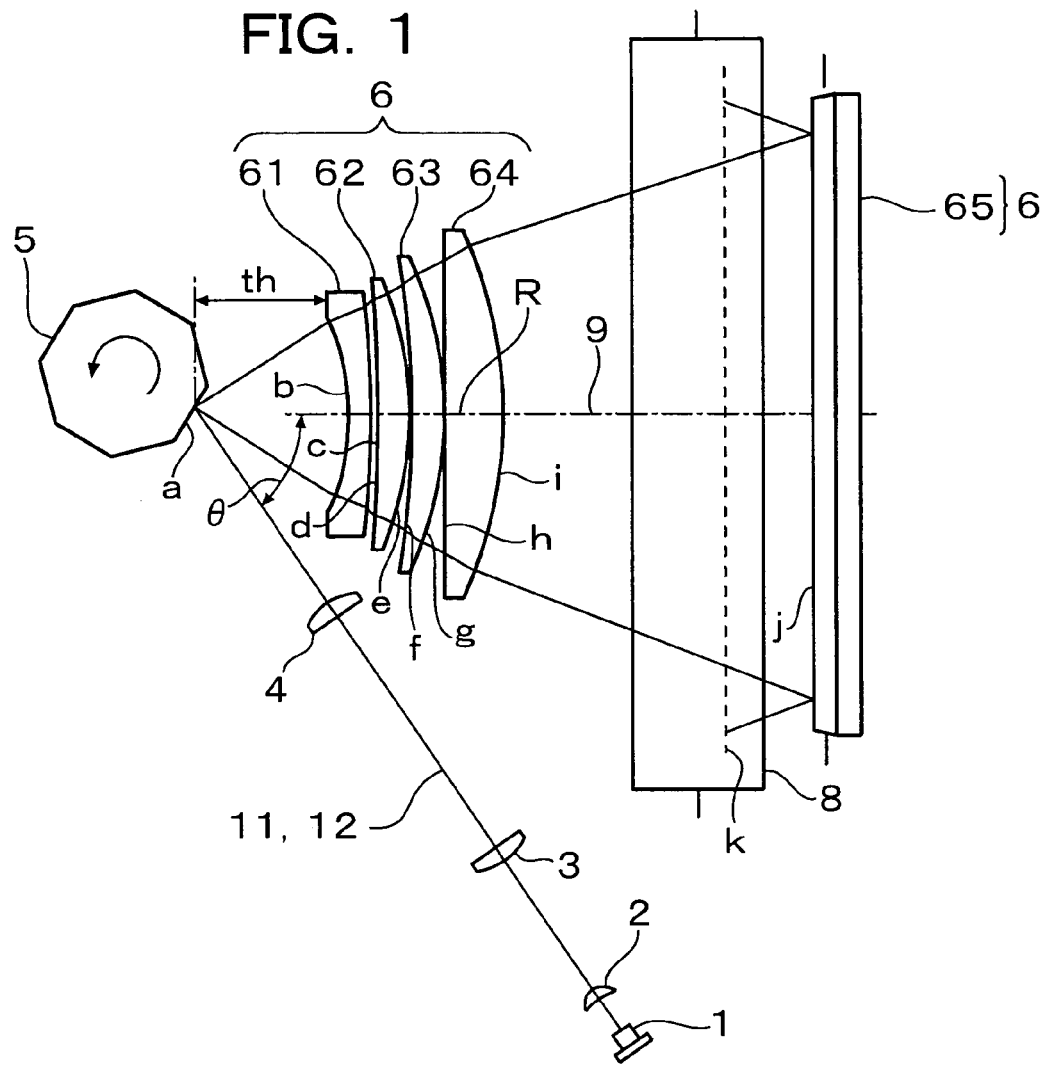
FIG. 1 is a schematic plane view of an optical scanner according to an embodiment of the present invention.
Figure 2:
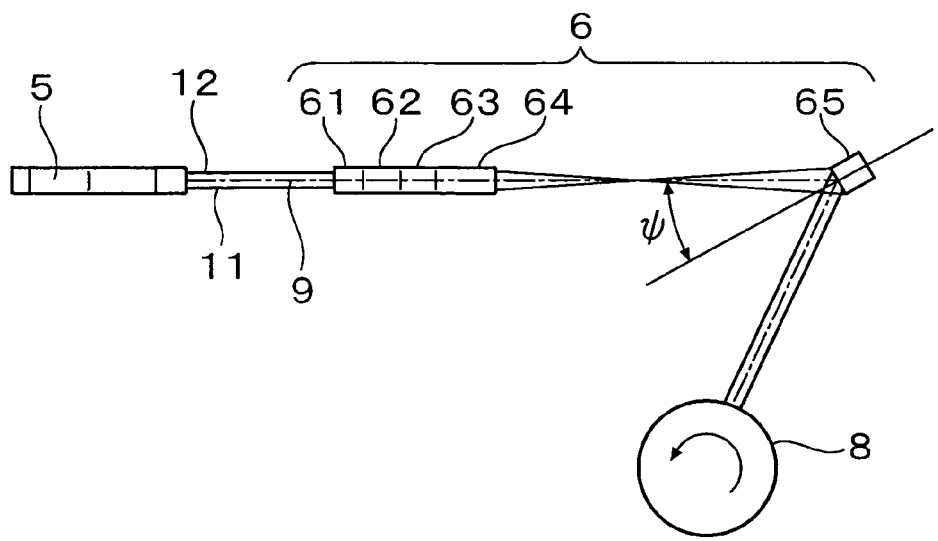
FIG. 2 is a schematic side view of the optical scanner.

Next, an embodiment of the present invention will be described with reference to the drawings. FIGS. 1 and 2 are a schematic plane view and a schematic side view of an optical scanner according to an embodiment of the invention.

In FIGS. 1 and 2, the reference numeral 1 represents a light source constituted by a two-element semiconductor laser array; 2, a collimator lens; 3, a cylindrical lens; 4, a spherical lens; 5, a polygon mirror serving as an optical deflector; 6, a scanning optics; 8, a photoconductor drum surface which is a to-be-scanned surface; 9, an optical axis of the scanning optics 6; and 11 and 12, beams of light.

As shown in FIG. 2, the scanning optics 6 is constituted by four lenses 61, 62, 63 and 64 and a reflecting mirror 65, and disposed between the polygon mirror 5 and the photoconductor drum surface 8.

As shown in FIG. 1, two beams 11 and 12 emitted from the light source (two-element semiconductor laser array) 1 pass through the collimator lens 2, the cylindrical lens 3 and the spherical lens 4. The beams 11 and 12 are then deflected by the polygon mirror 5 and imaged on the rotating photoconductor drum surface 8 by the scanning optics 6.

In the light source (two-element semiconductor laser array) 1, the beams 11 and 12 are disposed at a small distance from each other in the sub-scanning direction. For this reason, in FIG. 1, the beams 11 and 12 are illustrated as a single line.

The light source 1, the polygon mirror 5 and the photoconductor drum surface 8 are conjugated with one another with respect to the sub-scanning direction, and the light source 1 and the photoconductor drum surface 8 are conjugated with each other with respect to the main scanning direction. As a result, the beams 11 and 12 emitted from the light source 1 are projected on the photoconductor drum surface 8 as an image multiplied by an optical magnification, while an effect of correcting an optical face tangle error of the polygon mirror 5 can be obtained.

The collimator lens 2 serves to collimate the beams 11 and 12 emitted from the light source 1. The cylindrical lens 3 and the spherical lens 4 serve to convert the diameters of the beams in the main scanning direction, to align the beams near the polygon mirror 5, and to converge the beams 11 and 12 on the polygon mirror 5 in the sub-scanning direction.

Dimensions of the scanning optics 6 are shown in Table 1. The face sign a in Table 1 represents a reflection surface of the polygon mirror 5 shown in FIG. 1. The face signs b to i represent surfaces of the four lenses constituting the scanning optics 6. The face sign j represents a surface of the reflecting mirror 65 constituting the scanning optics 6. The face sign k represents the photoconductor drum surface 8.

The sign R in Table 1 represents a curvature radius near the optical axis in the main scanning direction, and r represents a curvature radius near the optical axis in a direction perpendicular to the sub-scanning direction. The sign th represents a face-to-face distance, and n represents an index of refraction. The signs R, r and th in Table 1 are expressed by units of mm.

TABLE 1

| face sign | R | R | th | n |
|---|---|---|---|---|
| a |   | ∞ | 72.7 | 1.0 |
| b |   | −115 | 9.0 | 1.839 |

TABLE 1-continued

| face sign | R | R | th | n |
|---|---|---|---|---|
| c |   | −693 | 3.6 | 1.0 |
| d |   | −480 | 14.4 | 1.514 |
| e |   | −155 | 1.4 | 1.0 |
| f |   | −358 | 14.3 | 1.514 |
| g |   | −165 | 1.4 | 1.0 |
| h |   | ∞ | 25.0 | 1.564 |
| i | −200 | −140 | 283.1 | 1.0 |
| j | ∞ | −54 | −317.8 |   |
| k | ∞ | −152 |   |   |

The faces b to h are rotationally symmetric faces. The faces i and j are faces whose sub-scanning direction curvature radii change continuously. The shapes of the faces i and j will be described below. Assume that X designates the main scanning direction, Y designates the sub-scanning direction, and Z designates the optical axis direction. Each shape is expressed by Expression (1).

$$Z = f_0(X,Y) + f_2(X,Y) \qquad \text{Expression (1)}$$

Here, $f_0(X,Y)$ designates a fundamental toric shape, and $f_2(X,Y)$ designates an rotationally asymmetrical additional function.

The sections of the faces i and j in the XZ plane of a local coordinate system using a crossing point of each face and the optical axis as an origin are expressed by Expression (2). The faces i and j are rotationally symmetric with respect to their axis that are located in the XZ plane, parallel to the X axis and away from the origin at a distance r along the Z axis.

$$f_0(X,Y) = (X^2/R)/\{1 \pm SQRT[1-(X/R)^2]\} \qquad \text{Expression (2)}$$

A section in the YZ plane is a circle with a curvature radius r. $f_2(X,Y)$ is expressed by Expression (3).

$$f_2(X,Y) = \Sigma a_{lm} X^l Y^m \qquad \text{Expression (3)}$$

Here, $a_{lm}$ designates a constant, which is shown in Table 2.

TABLE 2

| face sign | coefficient of additional function |
|---|---|
| i | $a_{12} = 1.1E-7$ |
|   | $a_{22} = 1.9E-8$ |
|   | $a_{04} = 3.0E-5$ |
|   | $a_{32} = 2.0E-11$ |
|   | $a_{42} = -2.2E-13$ |
|   | $a_{06} = -2.0E-6$ |
|   | $a_{52} = 6.0E-16$ |
|   | $a_{62} = 8.8E-17$ |
| j | $a_{22} = 1.4E-6$ |
|   | $a_{42} = 1.1E-10$ |

The face i is asymmetric with respect to the optical axis in the main scanning direction because the face i includes an odd-order term with respect to X, but symmetric with respect to the optical axis in the sub-scanning direction because the face i includes no odd-order term with respect to Y. The face j is symmetric with respect to both the optical axes in the main scanning direction and the sub-scanning direction because the face j includes no odd-order term with respect to both X and Y.

The other specifications are shown in Table 3.

TABLE 3

| | |
|---|---|
| number of faces of polygon mirror | 8 |
| inscribed circle radius of polygon mirror; $R_{POL}$ | 35.5 mm |
| angle between beam incident on polygon mirror and optical axis of scanning optics; $\zeta$ | 0.96 rad |
| angle between optical axis of lenses constituting scanning optics and normal of reflection mirror surface; $\phi$ | 0.3 rad |

Figure 3:
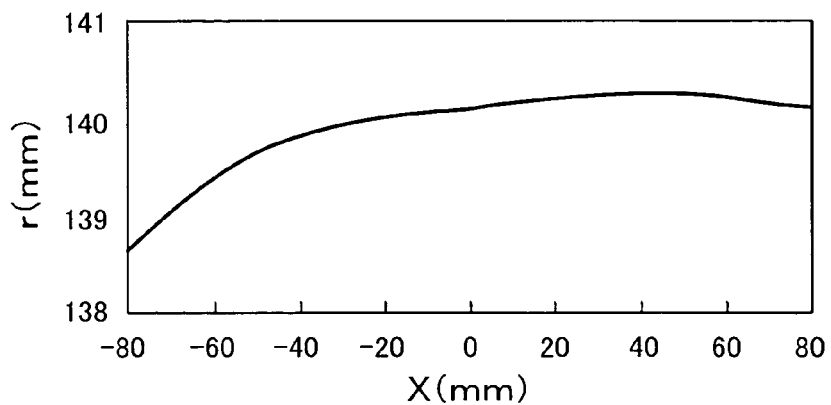
FIG. 3 is a characteristic graph showing the relationship between a curvature radius r of a scanning optics in the optical scanner and a main-scanning-direction coordinate X.

FIG. 3 shows the sub-scanning-direction curvature radius r of the face i. The curvature radius r varies continuously with respect to the main-scanning-direction coordinate X and asymmetrically with respect to the optical axis (X=0). This serves to correct an asymmetric change of the optical length caused by the relation $\zeta \neq 0$ shown in Table 3.

Since the face i is disposed more closely to the polygon mirror than the face j, the longitudinal size of the face i is smaller. The face i is not a reflection surface but a refraction surface. The face i can be produced by grinding a glass material with a grindstone. Therefore, even when the change of the curvature radius is asymmetric, the influence thereof is comparatively small enough to count for nothing especially.

Figure 4:
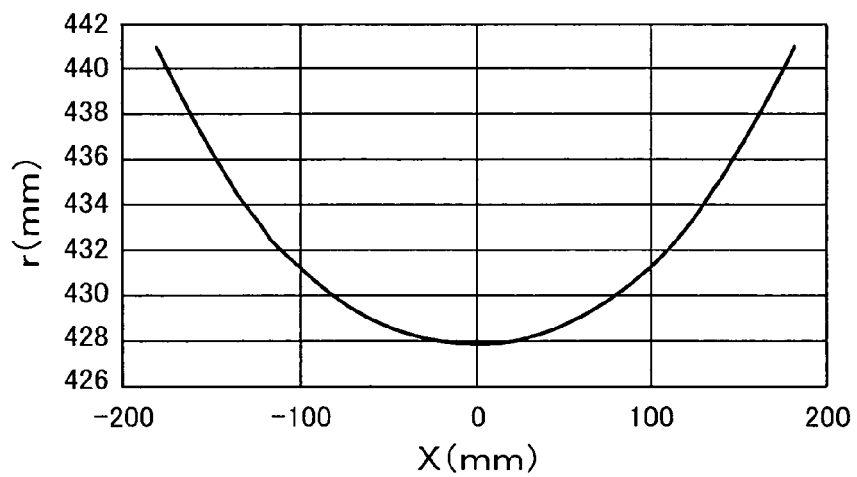
FIG. 4 is a characteristic graph showing the relationship between the curvature radius r of the scanning optics in the optical scanner and the main-scanning-direction coordinate X.

FIG. 4 shows the sub-scanning-direction curvature radius r of the face j. The curvature radius r varies continuously with respect to the main-scanning-direction coordinate X and asymmetrically with respect to the optical axis (X=0). This serves to optimize the position of a composite primary point in cooperation with the shape of the face i. The material of the face j is aluminum, which is cut by a diamond tool. For example, a free-form surface processing machine is used as a processing machine.

Figure 5:
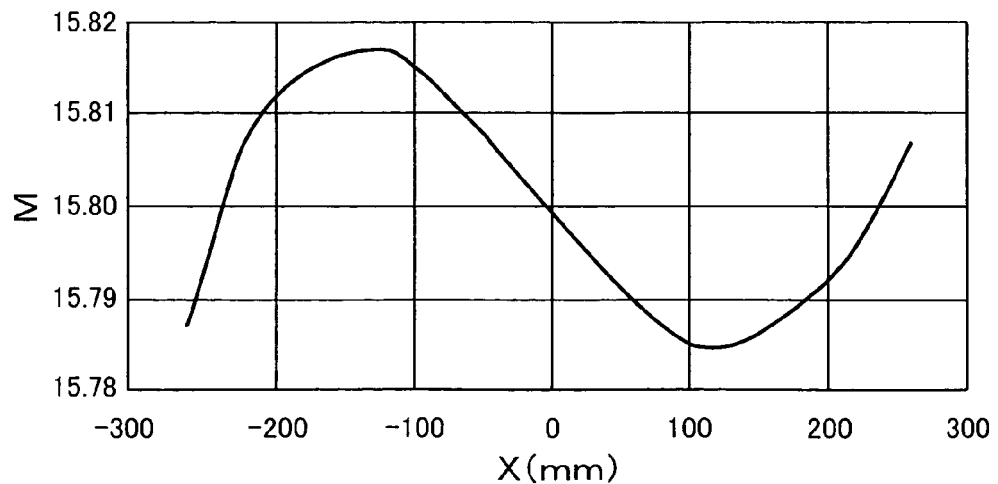
FIG. 5 is a characteristic graph showing the relationship between an optical magnification of an interval on a photoconductor drum surface with respect to that on a light source in the optical scanner and the main-scanning-direction coordinate X.

FIG. 5 shows a sub-scanning-direction optical magnification M of an interval on the photoconductor drum surface with respect to that on the light source. In FIG. 5, the abscissa designates the main-scanning-direction coordinate X on the photoconductor drum surface. When light sources 1 and 2 are disposed at an interval of 0.82 µm in the sub-scanning direction, the interval of scanning lines on the photoconductor drum surface can be obtained by multiplying the interval of 0.82 µm by the optical magnification M shown in FIG. 5. The magnification M is 15.8 in the scan center where X=0 mm. Therefore, the interval of the scanning lines is 42.3 µm, which is a value corresponding to 600 dpi in dot density.

Figure 6:
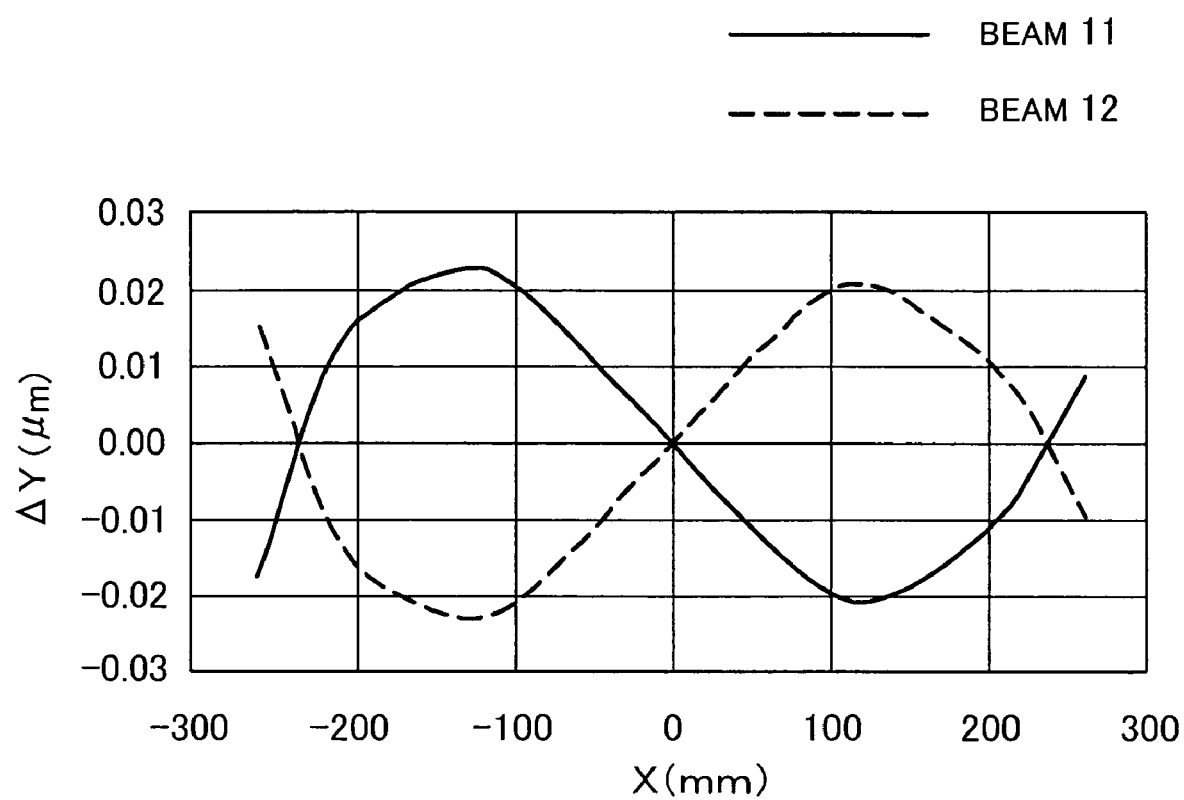
FIG. 6 is a characteristic graph showing the relationship between an error ΔY of a position of each beam on the photoconductor drum surface in the optical scanner and the main-scanning-direction coordinate X.

FIG. 6 shows an error ΔY of a sub-scanning-direction position of each beam 11, 12 on the photoconductor drum surface caused by a change of the optical magnification M shown in FIG. 5. The error ΔY of the sub-scanning-direction position of each beam 11, 12 on the photoconductor drum surface is not larger than 0.1 µm in a scanning range, which is an enough small value as compared with the interval 42.3 µm of the scanning lines.

Figure 7:
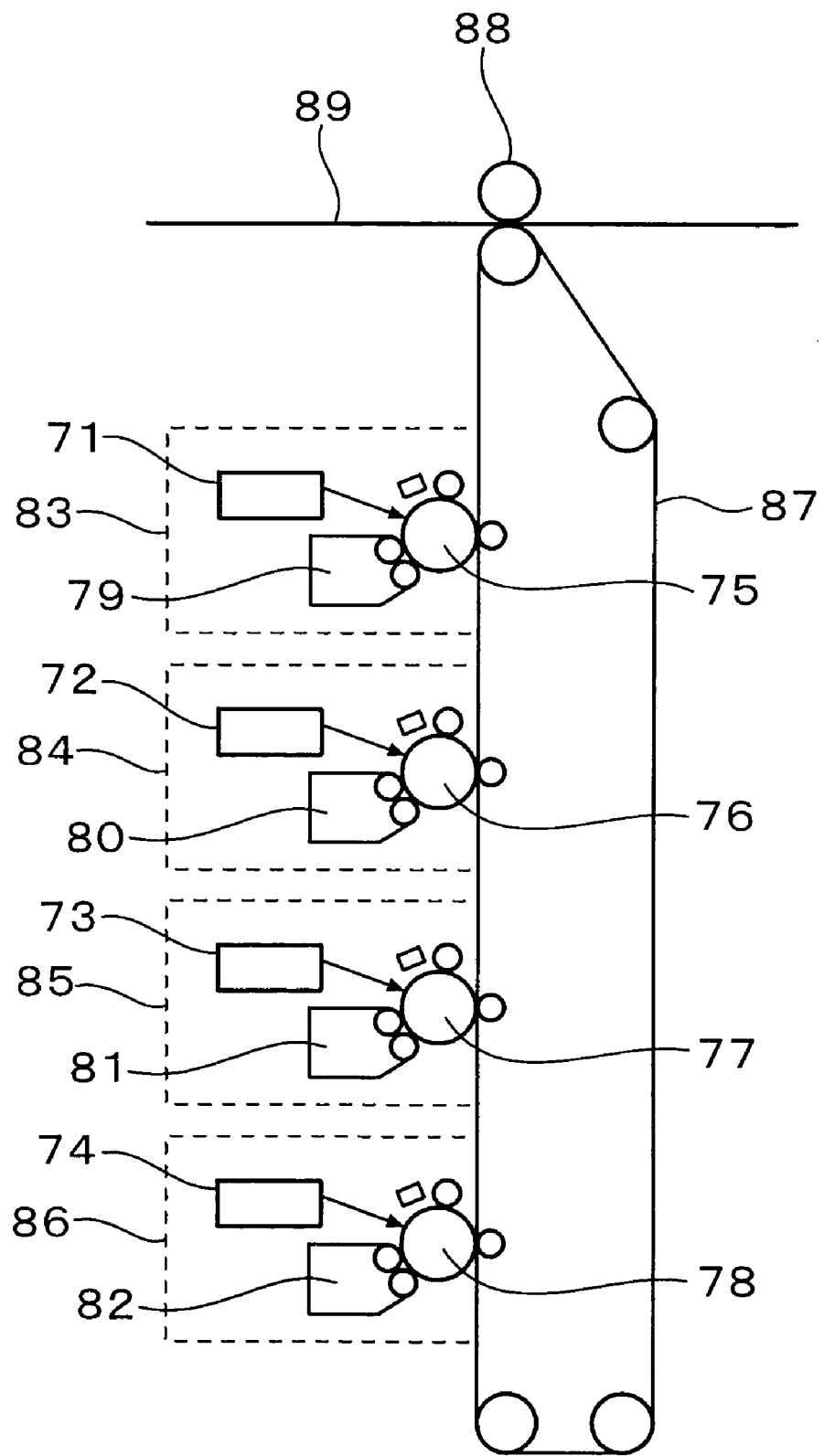
FIG. 7 is a schematic configuration view of a multi-color image forming apparatus using optical scanners according to the embodiment of the present invention.

FIG. 7 is a schematic configuration view of a multi-color image forming apparatus using a plurality of such optical scanners. In FIG. 7, the reference numerals 71-74 represent optical scanners; 75-78, photoconductor drums; 79-82, developing units; 83-86, printing units constituted by those parts. As shown in FIG. 7, the printing units 83-86 are disposed vertically (in the up/down direction). The printing units 83-86 correspond to a plurality of colors, for example, cyan, magenta, yellow and black.

Toner images formed on the photoconductor drums 75-78 of the printing units 83-86 respectively are transferred onto a belt-like intermediate transferor 87 so as to be superimposed on one another. Thus, a multi-color toner image is formed. The multi-color toner image is further transferred onto image recording paper 89 by a transferor 88. Thus, a multi-color image is formed.

In this embodiment, to put the polygon mirror 5 and the photoconductor drum surface 8 in a conjugated relationship with respect to the sub-scanning direction is not an essential requirement to obtain the effect of the invention. However, such a layout is a general layout intended to obtain an effect of correcting an optical face tangle error of the polygon mirror. Therefore, this embodiment is based on the layout.

Although two beams are used in this embodiment, 10 or more beams may be used. In this case, the influence of the inequity of the magnification in the scanning range on the interval of scanning lines becomes about one digit larger. Therefore, the effect of the invention becomes greater. For example, in this embodiment where two beams are used, the maximum value of the error ΔY is 0.023 µm as shown in FIG. 6. When 10 beams are used, the interval of scanning lines is 9 times as large as that in this embodiment. Thus, the maximum value of the error ΔY reaches 0.21 µm. This is an enough small value as compared with the interval 42.3 µm of adjacent scanning lines in 600 dpi. When 10 or more beams, for example, 32 beams are used, the effect of the invention becomes further larger.

A multi-color image forming apparatus may be arranged using a plurality of optical scanners. In this case, a plurality of colors are formed by different optical scanners. In order to suppress the occurrence of misalignment of the colors with one another, it is necessary to limit the relative value of scanning lines to each other more severely. The invention is also effective as means therefor.

Although the aforementioned embodiment has described a multi-color image forming apparatus using a plurality of optical scanners, the invention is not limited thereto. The invention is also applicable to an image forming apparatus using a single optical scanner.

What is claimed is:

1. An optical scanner comprising:
    a light source;
    an optical deflector for deflecting a plurality of beams emitted from the light source and performing scanning with the beams; and
    a scanning optics for scanning a to-be-scanned surface with the plurality of beams deflected by the optical deflector and imaging the beams on the to-be-scanned surface; wherein:
    the scanning optics includes refraction surfaces for refracting the beams and reflection surfaces for reflecting the beams, and at least one of the refraction surfaces is a surface having a curvature radius varying continuously in a direction perpendicular to a plane to be scanned with the deflected beams, while at least one of the reflection surfaces is a surface having a curvature radius varying continuously in a direction perpendicular to the plane to be scanned with the deflected beams.

2. An optical scanner according to claim 1, wherein the reflection surface having a curvature radius varying continuously is disposed on the to-be-scanned surface side of the refraction surface having a curvature radius varying continuously.

3. An optical scanner according to claim 1, wherein:
    the optical deflector is a polygon mirror, and an angle between each beam incident on the polygon mirror and an optical axis of the scanning optics is a predetermined angle in the plane to be scanned with the deflected beam;

one of the refraction surfaces having a curvature radius varying continuously has a curvature radius varying asymmetrically with respect to the optical axis of the scanning optics in a direction perpendicular to a plane including the deflected beams; and the reflection surface having a curvature radius varying continuously has a curvature radius varying symmetrically with respect to the optical axis in a direction perpendicular to the plane including the deflected beams.

4. An optical scanner according to claim 3, wherein the reflection surface having a curvature radius varying continuously is produced by grinding or cutting.

5. An optical scanner according to claim 1, wherein the reflection surface having a curvature radius varying continuously does not serve to bend light to a main scanning direction.

6. An optical scanner according to claim 1, wherein the number of beams is 10 or more.

7. An image forming apparatus comprising:

a photoconductor;

a charging unit for charging a surface of the photoconductor;

an optical scanner for irradiating the charged surface of the photoconductor with beams in accordance with recording information so as to form an electrostatic latent image;

a developing unit for developing the electrostatic latent image with toner so as to form a toner image; and a transfer unit for transferring the toner image onto a recording piece; wherein:

the optical scanner is an optical scanner according to any one of claims 1 through 6.

8. An image forming apparatus according to claim 7, wherein a plurality of printing units each having the photoconductor, the charging unit, the optical scanner and the developing unit are provided, and toner images of a plurality of colors are formed by the printing units respectively.

* * * * *